United States Patent [19]

Hassler et al.

[11] 4,140,745
[45] Feb. 20, 1979

[54] METHOD OF RECOVERING MAGNESIA FROM SCRAP BRICK

[75] Inventors: Hedvig E. B. Hassler, Enskede; Per G. Kihlstedt, Bromma, both of Sweden

[73] Assignee: Advanced Mineral Research AB, Stockholm, Sweden

[21] Appl. No.: 867,887

[22] Filed: Jan. 9, 1978

[30] Foreign Application Priority Data

Jan. 10, 1977 [SE] Sweden .............................. 7700156

[51] Int. Cl.$^2$ .............................................. C01F 5/24
[52] U.S. Cl. ........................................ 423/165; 423/155
[58] Field of Search ............... 423/159, 165, 155, 158, 423/161, 636, 637

[56] References Cited

U.S. PATENT DOCUMENTS 2,462,277   2/1949   Naugle .................................. 423/159

FOREIGN PATENT DOCUMENTS 17888 of    1901   United Kingdom ..................... 423/159
861931     3/1961  United Kingdom ..................... 423/155

*Primary Examiner*—O. R. Vertiz
*Assistant Examiner*—Wayne A. Langel
*Attorney, Agent, or Firm*—Fleit & Jacobson

[57] ABSTRACT

Magnesia is recovered from scrap lining material rich in magnesia by leach treatment of the material with water in the presence of carbon dioxide under pressure, separating the leaching solution from solid leaching residues, precipitating out magnesium hydrocarbonates from the leaching solution and calcining the precipitate to form magnesia. To make the scrap lining material more readily leachable and enable the production of a rich leaching solution said lining material, prior to the leaching treatment, is treated with steam at a temperature within the range of 100–300° C. and corresponding saturation pressures for a period of 1 – 50 hours.

19 Claims, No Drawings

METHOD OF RECOVERING MAGNESIA FROM SCRAP BRICK

The present invention relates to a method of recovering magnesia from scrapped lining material rich in magnesia.

Magnesia raw materials have obtained an increased significance in the manufacture of both refractory materials and various chemical products. Magnesia, i.e. magnesium oxide, is produced from mineral finds containing magnesite, $MgO \cdot CO_2$, as valuable mineral, and from seawater, which contains approximately 0.13 percent by weight Mg, mainly in the form of dissolved salts.

In the manufacture of certain magnesium oxide refractory products, particularly magnesite brick, it is important, both from the aspect of manufacture and from the aspect of the refractory properties of the products, that the magnesium oxide used as the starting material is highly pure. This requires exhaustive purification of the mineralic magnesia raw materials prior to their being fired or calcined to form magnesium oxide. In a corresponding manner, the magnesium-rich precipitates recovered from seawater must be exhaustively purified, before a magnesium oxide material suitable for qualified use can be obtained therefrom.

The magnesia-based refractory lining materials have only a limited length of life in those furnaces in which they are used. The materials are deleteriously affected, inter alia, by molten slag and iron oxide, by high temperatures and by the variations in temperature to which they are subjected in the furnaces, the linings becoming pitted and their mechanical strength impaired to such an extent that they must finally be replaced by a new lining. The material removed when changing a lining, this material, for example, being in the form of scrapped bricks, comprises to a large extent MgO, of which a part is contaminated with slag etc. The recovery of the MgO content of this lining material would enable valuable raw materials to be returned for re-use in the manufacture of, for example, magnesite brick or for the manufacture of other qualified products, particularly if the recovered magnesia material is of good quality and at least substantially free from impurities, primarily impurities in the form of $SiO_2$ and iron oxides.

Previous experiments have shown that certain magnesium-rich minerals, e.g. brucite ($MgO \cdot H_2O$), which is not soluble in pure water, can be dissolved to some extent in water containing $CO_2$ at a $CO_2$-pressure of a few atmospheres and without substantially elevated temperature. Experiments have also been made to leach under $CO_2$-pressure impure magnesite materials which had been fired at approximately 600° to 650° C. These experiments, however, have not resulted in a commercially usable method, since in both cases the leaching solutions were too weak. The content of MgO per litre of leaching solution has, in general, reached only 3–9 grams/litre.

As opposed to the MgO-products calcined at the lower temperatures, commercial magnesite brick fired at higher temperatures and corresponding molten magnesite material have been considered more or less inert to the influence of, inter alia, water, and leaching with water under carbon-dioxide pressure has not produced any worthwhile results either.

The present invention provides a novel and useful method by which high-quality magnesia can be commercially recovered from scrap lining material rich in magnesia, said material including scrapped fired or chemically bound magnesite brick obtained from high-temperature furnaces and scrapped linings which have been produced from molten magnesite. The method according to the invention is primarily characterized by the fact that said lining material is first treated with steam at a temperature within the range of 100–300° C. and corresponding saturation pressures over a period of time of 1–50 hours, whereafter the steam-treated material is subjected to a water-leaching process at a temperature which ranges from freezing point to approximately 60° C., in the presence of carbon dioxide under pressure, the leaching solution being separated from solid leaching residues and magnesium-hydrocarbonates dissolved therein are precipitated out and calcined.

By steam-treating the material in accordance with the invention, scrapped magnesite material fired at high temperatures or molten magnesite material which is not suitable for treatment by conventional carbondioxide leaching processes, is brought to a state in which the MgO content thereof can readily be leached out with water under carbon-dioxide pressure. The steam-treatment process causes the lining material to react whilst foaming; it would appear that MgO is converted to $MgO \cdot H_2O$. When leaching the obtained magnesiumhydrate product with carbon dioxide, silicate-containing impurities and iron oxide containing impurities remain in a solid leaching residue when the leaching solution is subjected to a filtering, decantering or any other separating process, so that a highly pure MgO product is obtained subsequent to precipitating out the magnesium-hydrocarbonates obtained during the carbon-dioxide leaching process from the separated leaching solution, and firing these magnesium-hydrocarbonates.

The length of time and the temperature required in respect of the steam-treatment process according to the invention are dependent, to a certain extent, upon the type of lining material and the size of the lumps or particles to be treated. Normally, the requisite steam-treatment time decreases with increasing temperature. Time ranges and temperature ranges of 6–30 hours and 160°–250° C. respectively have been found sufficient and suitable in respect of the majority of existing magnesia-rich lining materials, times and pressures of approximately 16 hours and approximately 205° C. respectively being normally preferred. Leaching can be effected without supplying heat, although leaching can be effected more rapidly and is made easier by supplying a certain amount of heat. Optimal results are obtained normally within the temperature range of 30°–50° C., particularly at temperatures of approximately 40° C. The leaching process is conveniently effected with a limited amount of water relative to the amount of steam-treated lining material, such that a rich leaching solution is obtained from which the leached magnesium-hydrocarbonates can readily be separated in an economic manner. The requisite contact time between the leaching liquid comprising carbon-dioxized water and the steam-treated lining material is not only dependent upon the temperature, but also upon other conditions. For example, effective agitation and increased pressure promotes a rapid and more complete leaching of the magnesium-hydrates formed during said steam-treatment process from the steam-treated lining material. For example, pressures of 3–20 atm, suitably 5–15 atm, and leaching times of 1–20 hours, suitably 3–10 hours can be applied.

In order to promote the contact between the steam and the lining material, thereby to expedite the steam-treatment process, it is suitable to disintegrate or to crush the lining material to a certain extent prior to said steam-treatment. The lining material however, should not be disintegrated or crushed to such an extent that it is only slightly permeable and that, because of its slight permeability, the steam cannot readily penetrate to all parts of the material. Thus, it has been found that the lining material should not be disintegrated or crushed to a particle size smaller than that corresponding to a $K_{80}$-value of approximately 10 mm (80 percent by weight finer than approximately 10 mm). Further, the crushed or disintegrated lining material can conveniently be screened or dusted-off in a manner such as to remove the finest particles, which particles are those which reduce the permeability of the crushed material the most. These fine particles are predominantly obtained from the more readily crushed, slag-pitted and contaminated parts of the lining material, and hence by screening off these fine particles the remaining material is purer than the original, scrapped lining material, thereby enabling a purer end product to be obtained. In practice it has been found particularly advantageous to separate from the crushed or disintegrated lining material, fractions having a particle size of less than 0.5–1 mm.

When leaching steam-treated material with water, in accordance with the invention, under pressure and in the presence of carbon dioxide, leaching solutions containing approximately 30 gram MgO per litre of leaching solution can normally be obtained, which is satisfactory both from a technical and from an economic point of view. The amount of MgO per litre of leaching solution can be increased, such increase improving the process economy, if the leaching operation is carried out in two or more stages and if the solution obtained from one or more of the stages following the first leaching stage is used as a leaching liquid in a preceding leaching stage. By using such a multi-stage leaching process, leaching solutions can be obtained which contain 40 gram MgO per litre, or thereabove, provided that the addition of water to the first leaching stage is limited. In accordance herewith, it is preferred in a multi-stage leaching process to limit the amount of water charged to the first leaching stage to an extent such that the amount of MgO dissolved in said stage is at most approximately 50 percent by weight of the MgO-content of the steam-treated material.

Leaching solution rich in MgO is separated from the leaching material or the solid leaching residues suitably under a pressure of carbon-dioxide, thereby to avoid unintentional re-precipitation of magnesium-hydrocarbonates present in the leaching material. Subsequent hereto, a substantial part of these dissolved magnesium-hydrocarbonates can, to advantage, be precipitated out by rapidly or instantaneously relieving the pressure acting on the separated leaching solution, optionally whilst adding a nucleation agent for the purpose of facilitating the process of precipitation and to render it more complete. The nucleation agent may, to advantage, comprise a small quantity of previously precipitated magnesium-hydrocarbonate or MgO in powder form. Such nucleation agents can also be used to precipitate magensium-hydrocarbonates in relatively large quantities from leaching solutions from which the pressure is relieved so slowly that no spontaneous precipitation of magnesium-hydrocarbonates is obtained, or so that only minor quantities are precipitated spontaneously. The residual leaching solution, which still has a certain quantity of magnesium-hydrocarbonate dissolved therein, normally of the order of magnitude of 1/3 the original quantity dissolved therein, can be separated, e.g. decanted, from the precipitated magnesium-hydrocarbonates and used as leaching liquid in conjunction with the stepwise leaching process described above, while the precipitated magnesium-hydrocarbonate is further de-watered and calcined to form magnesium oxide.

The steam-treatment process may be carried out in an autoclave, in which autoclave the leaching treatment of the steam-treated material may also be carried out. To this end, the autoclave is provided with an inlet for water and carbon-dioxide and may also be provided with an agitator means for promoting intimate contact, during the leaching process, between the material being leached and the leaching medium, which comprises water and carbon dioxide under pressure. Such an autoclave in which leaching is also carried out may be provided with means for enabling the leaching solution and leaching residue to be discharged separately therefrom.

The leaching process, however, may be carried out to particular advantage in a filter press, e.g. a chamber filter press. The steam-treated material may be agitated to form a slurry, whilst adding water or water containing magnesium-hydrocarbonates, and carbon dioxide, and the slurry pumped to the filter press. Any further liquid and carbon dioxide required for the leaching process may then be passed to and led through the filter press, and a counter-pressure may be maintained at the outlet of the filter press in order, as discussed above, to prevent unintentional precipitation of the magnesium-hydrocarbonates which have been leached out. Optionally, the filter press may be charged with magnesia-rich lining material in block, lump or particle form and the steam-treatment process may be carried out in the filter press by charging steam thereto, whereafter the leaching process is carried out by conducting leaching liquid and carbon dioxide under pressure to and through the filter press. It is also possible to conduct solely the steam-treatment process in the filter press and then to effect the leaching process in one or more stages in one or more separate leaching vessels.

EXAMPLE

Magnesia-based scrap brick crushed to a particle size of which 80% of the particles were finer than approximately 5 mm, was steam-autoclaved for 16 hours at 205° C. and a pressure of 15 atm steam-pressure, whereupon the material swelled and became finely divided whilst increasing its weight by 36.5%. The mass was allowed to cool, and whilst being stirred, was leached with water at a temperature of approximately 40° C. for 3 hours at a carbon-dioxide pressure of 12 atm. Approximately 50% of the magnesia content was dissolved, the leaching solution having an MgO-concentration of approximately 30 gr/litre. The leaching solution was then filtered off, whereupon the residual product was again leached in accordance with the above using a fresh leaching liquid. Here a further 25% of the magnesia content was dissolved. This further leaching solution was filtered and used as a primary leaching liquid for a new batch of scrapped brick material autoclaved in accordance with the above, the final MgO concentration rising to approximately 40 gr/litre in this leaching solution. The magnesium content of this latter leaching solution, said content comprising mainly magnesium-hydrocarbonates, can be precipitated out and calcined in a conventional manner, and the solution remaining subsequent to said precipitation may be re-used as a leaching liquid.

We claim:

1. A method of recovering magnesia from impure magnesia-containing scrap material, characterized in that said scrap material is first treated with steam at a temperature within the range of 100°–300° C. and corresponding saturation pressures for a period of time of 1–50 hours, whereafter the steam-treated material is leached with water at a temperature of up to approximately 60° C. in the presence of carbon dioxide under pressure to form magnesium hydrocarbonates, whereafter the leaching solution is separated from the solid leaching residues and the magnesiumhydrocarbonates dissolved in said solution are precipitated out and calcined to form magnesia.

2. A method according to claim 1, characterized in that said leaching process is carried out in two or more stages, and in that a leaching solution obtained from one or more stages following the first leaching stage is used as a leaching liquid in a preceding leaching stage.

3. A method according to claim 2, characterized in that leaching is carried out with a limited supply of water to the first leaching stage such that the dissolution of MgO in said stage is at most 50 percent by weight of the MgO-content of the steam-treated material.

4. A method according to claim 3, characterized in that the steam-treatment process is carried out in a filter press.

5. A method according to claim 3, characterized in that: the steam treatment is at a temperature of approximately 205° C., for a time of approximately 16 hours and at a pressure of approximately 15 atmospheres; the leaching treatment is at a temperature of approximately 40° C. for a time of approximately 3 hours, and at a carbon dioxide pressure of approximately 12 atmospheres; and the scrap material is magnesia-based scrap brick crushed to a particle size of which 80% of the particles are finer than approximately 5 mm.

6. A method according to claim 1, characterized in that said scrap material is crushed prior to the steam-treatment process.

7. A method according to claim 6, characterized in that prior to said steam-treatment process the scrap material is screened or dusted-off to provide good permeability, by removing particles therefrom having a size smaller than 0.5–1 mm.

8. A method according to claim 6, characterized in that the scrap material is crushed so that not more than 80 percent of the particles are smaller than 10 mm.

9. A method according to claim 1, characterized in that the leaching treatment is at a temperature of from 30° to 50° C.

10. A method according to claim 9, characterized in that the temperature is approximately 40° C.

11. A method according to claim 1, characterized in that the steam treatment is at a temperature of from 160 to 250° C. and a time of from 6 to 30 hours.

12. A method according to claim 11, characterized in that the temperature is approximately 205° C. and the time is approximately 16 hours.

13. A method according to claim 1, characterized in that the leaching solution is separated from solid leaching residues under carbon-dioxide pressure.

14. A method according to claim 13, characterized in that magnesium-hydrocarbonates dissolved in the leaching solution are precipitated out by relieving the pressure on the leaching solution substantially instantaneously.

15. A method according to claim 1, characterized in that at least one nucleation agent is added to the leaching solution to facilitate precipitation of the magnesium hydrocarbonates therefrom.

16. A method according to claim 15, characterized in that the nucleation agent is previously precipitated magnesium hydrocarbonate or magnesium oxide in powder form.

17. A method according to claim 1, characterized in that the temperature of the water-leaching is not less than 0° C.

18. A method according to claim 1, characterized in that leaching of the steam-treated scrap material is carried out in a filter press.

19. A method according to claim 1, characterized in that the scrap material is magnesite brick used as refractory lining.

* * * * *